Feb. 2, 1943.   F. E. JOHNSON   2,309,732
ROTARY OPERATIVE FASTENER
Filed April 16, 1940

Inventor.
Frank E. Johnson.
by John Todd
Att'y.

Patented Feb. 2, 1943

2,309,732

UNITED STATES PATENT OFFICE

2,309,732

ROTARY OPERATIVE FASTENER

Frank E. Johnson, Malden, Mass., assignor to United-Carr Fastener Corporation, Cambridge, Mass., a corporation of Massachusetts Application April 16, 1940, Serial No. 329,918

6 Claims. (Cl. 24—221)

This invention relates to improvements in rotary operative type fasteners and installations thereof.

In the drawing, which illustrates a preferred embodiment of my invention:

Figure 1:
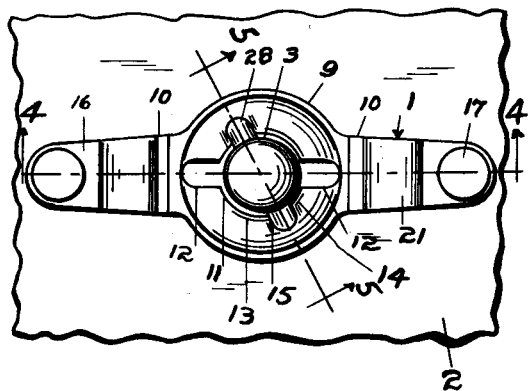
Fig. 1 is a rear elevation of an installation embodying my invention.
Figure 2:
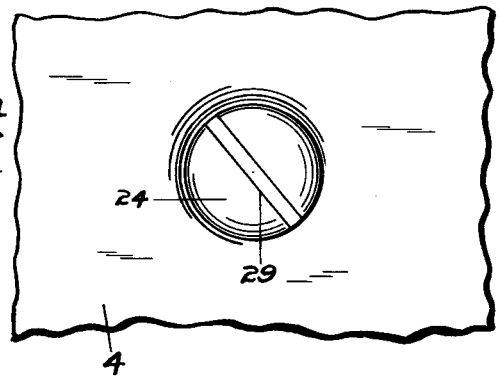
Fig. 2 is a front elevation of the installation shown in Fig. 1.
Figure 3:
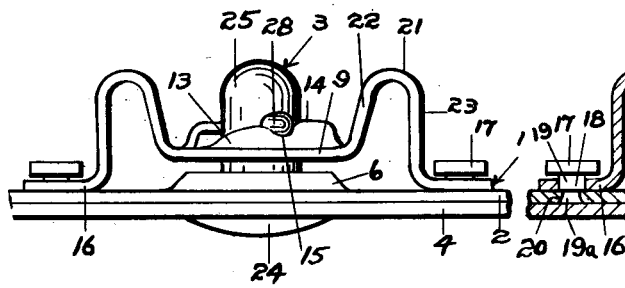
Fig. 3 is a side elevation of the installation shown in Figs. 1 and 2.

Referring to the drawing, I have shown a rotary type of fastener particularly adapted for use in aircraft manufacture but capable of use for any purpose where it is desired to secure together two rigid plate-like members. The fastener illustrated comprises two units, one of which I shall term a spring member and the other of which I shall call a rotary member. The spring member 1 is secured on one side of a plate-like support 2 and the rotary member 3 is carried by a plate-like support 4. The plate 2, in my preferred installation, has an aperture 5 surrounded by a frusto-conical wall 6 and the plate 4 has an opening 7 through which the rotary member projects. The opening 7 is preferably surrounded by an embossment 8 which enables the support 4 to present a substantially flush outer surface when the parts of the installation are in final assembly.

Figure 4:
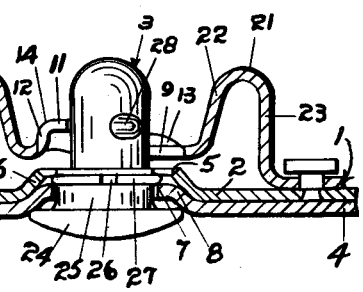
Fig. 4 is a sectional view taken along the line 4—4 of Fig. 1.
Figure 5:
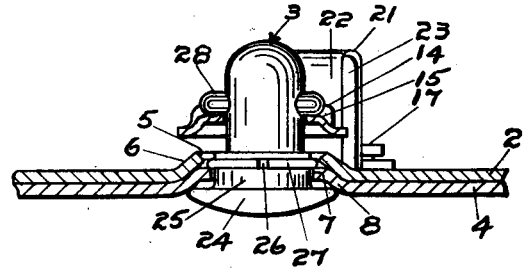
Fig. 5 is a sectional view taken along the line 5—5 of Fig. 1.

The spring member of my installation is preferably formed from one piece of sheet metal and, in my preferred form, has an elongated body providing a main body portion in the form of a generally circular portion 9 and narrow elongated portions 10—10 (Fig. 1) extending from opposed sides of the circular portion 9. The circular portion 9 has a substantially circular aperture 11 and a pair of slots 12—12 extending from opposite sides of the aperture, as most clearly shown in Fig. 1. The circular portion 9 is embossed on opposite sides of the aperture 11 and these embossments preferably extend in arcs concentric with the aperture 11. Each embossment has a gradually rising cam surface 13 extending from a low point adjacent one of the slots 12 and continuing to a high point 14 adjacent the other slot. Intermediate the ends of the embossed portion I have provided a locking recess 15 adapted to receive a pin of the rotary member 3 to effect fastening of the parts, as will be more fully described in connection with the operation of the fastener. The circular portion 9 is preferably spaced substantially above the frusto-conical portion 6 of the plate 2 when the parts of the installation are finally assembled in order to prevent interference between these portions during fastening and unfastening rotation of the parts. Each of the narrow portions 10 has a flat portion 16 at its outermost free end disposed in a plane substantially parallel to and beneath the general plane of the circular portion 9. The spring member is secured in permanent assembly with the plate 2 preferably through rivet members, each of which provides a head 17 at one end spaced slightly from the flat portion 16, a shank portion 18 extending through the flat portion 16, a shoulder 19 and a spaced head 19ª at an opposite end received within a countersunk hole 20 in the plate 2, as shown in Fig. 4. Each of the narrow portions 10 has a reverse-bend portion 21 intermediate the flat portion 16 at its point of junction with the circular portion 9. The sides 22 and 23 of the reverse-bend portion 21 are spaced substantially one from another and extend, in my preferred form, at substantially a 90° angle relative to the general planes of the circular portion 9 and the flat portions 16. As a result of the inherent resiliency of the reverse-bend portions 21, the spring member may be compressed during fastening and unfastening of the parts.

The rotary member 3 comprises a head portion 24 which is larger in diameter than the opening 7 of the plate 4 and a shank portion 25. The shank portion 25, which is smaller in diameter than the opening 7 of the plate 4, has an annular groove 26 spaced from the head 24 adapted to receive a split ring 27 whereby the rotary member is held in assembly with the plate 4. A pin member 28 is driven or otherwise secured in an aperture of the shank so that opposite ends of the pin extend beyond opposite surfaces of the shank in a direction transverse to the normal axis of the shank. The head 24 has a slot 29 to receive a suitable implement by which the device may be rotated.

To assemble the parts of the installation, the plate 4 is brought into superposed relation with the plate 2 so that the aperture 7 is in approximate alignment with the aperture 5, behind which is located the aperture 11 in the spring member. As the shank 25 passes through the aperture 5, it is guided by its rounded nose through the aperture 11 even though the parts may be slightly misaligned. During this operation the pin member 24 will pass through the slots 12—12, if aligned therewith, or may be turned into proper alignment to pass therethrough. After the pin has passed through the slots 12—12, the rotary member is turned in a clockwise direction causing the pin 28 to engage over the cam surfaces 13, at the same time compressing the spring member by moving the side portions 22 and 23 of one of the reverse-bend portions 21 toward each other thereby separating the side portions 22 and 23 of the other reverse-bend portion. When the ends of the pin arrive at the recesses 15—15, the spring member, because of its tendency to return to normal shape, presses the spring against the pin so that it enters the recesses and is held against accidental rotation by vibration once the parts are fastened together. The high portions 14—14 provide a stop to prevent the rotary member being turned beyond the point where the pin enters the locking recesses. The fastener may be unlocked by reversing the action hereinabove described.

My improved fastener is simple in construction and the parts thereof may be quickly assembled with their respective supporting plates. Also, the fastener is strong and durable and provides by reason of the reverse-bend portions hereinabove described sufficient resiliency in the spring member to effect a permanently positive fastening even though subjected to constant vibration.

Although I have illustrated and described a preferred embodiment of my invention, I do not wish to be limited thereby because the scope of my invention is best defined in the following claims.

I claim:

1. A spring member for fastener cooperation with a rotating member of the type having a shank and at least one projection extending from said shank, said spring being formed from sheet metal and providing a main body portion having an aperture adapted to receive a portion of the shank and the projection of the rotating member, said body providing a depression and a stop adjacent said aperture for fastener cooperation with said projection during rotative movement, and a U-shaped portion intermediate said aperture and one of the longitudinal ends of said spring, said U-shaped portion having spaced side elements and a bight connecting said elements, said U-shaped portion having its bight disposed out of the general plane of said body portion with the planes of said side elements substantially transverse to the general plane of said body portion to increase the resiliency of said spring during normal fastening and unfastening rotation of the parts, and the longitudinal ends of said strip being substantially parallel to the general plane of said body portion and adapted to be secured to a supporting panel.

2. A fastener member for cooperation with a rotating member of the type having a shank and a transversely extending projection extending from opposite sides thereof; said fastener being formed from sheet metal and providing a base portion adapted to be attached to one face of a support, a stud-receiving cam portion supported in outwardly spaced relation relative to said support, and U-shaped means connecting said cam portion to said base portion.

3. A fastener member for cooperation with a rotating member of the type having a shank and a transversely extending projection extending from opposite sides thereof; said fastener being formed from sheet metal and providing a base portion adapted to be attached to one face of a support, a stud-receiving cam portion supported in outwardly spaced relation relative to said base, and a U-shaped connecting strip connecting said cam portion and base.

4. A fastener member for cooperation with a rotating member of the type having a shank and a transversely extending projection extending from opposite sides thereof; said fastener member comprising a base portion provided with spaced openings for the reception of attaching means for attaching said base to a support, a stud-receiving cam portion spaced outwardly from said base portion and intermediate said openings, said cam portion being formed with a central aperture to receive the end of said rotating member and oppositely disposed radial elongations of said aperture adapted to admit the projections on said rotating member, the marginal portions of said aperture and elongations being outwardly dished and shaped to provide permanently rigid cam means on opposite sides of said aperture and elongations, the cam means on each side of said aperture comprising an upwardly sloping cam surface starting from one side of one radial extension, an upwardly extending stop means adjacent the opposite radial elongation, and a seat for said projection intermediate said upwardly sloping cam and stop, and a U-shaped connecting strip connecting said base and cam portion.

5. In a fastener for cowling or the like, a fastening element comprising an elongated strip of stamped and hardened sheet metal having a rigid central portion with an aperture adapted to receive a cooperating rotary fastening element, means for securing a part of said fastening element at spaced points to a part to be fastened, said central portion being drawn and rigid in all directions around the margins of said aperture and the marginal portions thereof defining said aperture being deformed to provide rigid cam and seat means for interlocking engagement with fastening means on such rotary fastening element in response to turning movement of the latter, and a U-shaped connecting strip connecting said central portion and part secured to the part to be fastened.

6. In a fastener for cowling or the like, a fastening element comprising an elongated strip of stamped and quench-hardened sheet steel having a rigid central portion with an aperture adapted to receive a cooperating rotary fastening element, said central portion having oppositely disposed portions defining radial extensions of said aperture to admit radial arms of said rotary element, means for securing a part of said fastening element at spaced points to a part to be fastened, said central portion being drawn and rigid in all directions around the margins of said aperture, the marginal portions thereof defining said aperture being deformed to provide oppositely disposed, inclined rigid cams extending outwardly from corresponding sides of said radial openings, rigid humps at the tops of said cams, oppositely disposed rigid radial grooves next to said humps for receiving and holding such radial arms, and oppositely disposed rigid abutments next to said grooves to prevent rotation of said arms beyond said grooves, the path of rotation between the axis of said openings and the axis of said grooves covering an angle substantially greater than 90°, and a U-shaped connecting strip connecting said central portion and part secured to the part to be fastened.

FRANK E. JOHNSON.